United States Patent [19]

Townsend, Jr.

[11] Patent Number: 5,257,666
[45] Date of Patent: Nov. 2, 1993

[54] STAND UP HAND CULTIVATOR

[76] Inventor: Charles E. Townsend, Jr., 11 Ranch Rd., Orinda, Calif. 94563

[21] Appl. No.: 885,796

[22] Filed: May 19, 1992

[51] Int. Cl.$^5$ .............................................. A01B 1/16
[52] U.S. Cl. ................................... 172/378; 172/381; 294/61; 81/489
[58] Field of Search .................. 172/378, 381; 294/61; 81/489, 20; 482/20; 273/416, 419

[56] References Cited

U.S. PATENT DOCUMENTS

| | | | |
|---|---|---|---|
| 1,182,918 | 5/1916 | McQuaide | 172/378 |
| 1,411,435 | 4/1922 | Hosmer | 172/378 |
| 2,010,325 | 8/1935 | Sawyer | 172/378 |
| 2,066,803 | 1/1937 | Sawyer | 172/378 |
| 2,251,587 | 8/1941 | Gagner | 294/61 |
| 2,378,459 | 6/1945 | Beardsley | 172/371 |
| 2,796,011 | 6/1957 | Schmidt | 172/375 |
| 3,746,334 | 7/1973 | Stubblefield | 482/20 |
| 4,183,570 | 1/1980 | Broyles et al. | 294/61 |
| 4,333,643 | 6/1982 | Saffire | 482/20 |
| 4,418,732 | 12/1983 | Kolonia | 81/489 |
| 4,823,654 | 4/1989 | Moore | 294/61 |
| 5,005,888 | 4/1991 | Parks et al. | 294/61 |
| 5,046,387 | 9/1991 | Levake | 81/489 |
| 5,115,530 | 5/1992 | Distiso | 81/489 |

FOREIGN PATENT DOCUMENTS 718169  9/1965  Canada ............................... 172/378

Primary Examiner—Randolph A. Reese
Assistant Examiner—Spencer Warnick
Attorney, Agent, or Firm—Charles E. Townsend, Jr.

[57] ABSTRACT

A stand up hand-held tool to penetrate soil for purposes of cultivation, weeding and the like. The tool comprises an elongate spear shaft, at least one end of which is pointed or otherwise formed to provide a leading edge for expeditious soil penetration. An elongate tubular handle grip, preferably extending about 2/5 the length of the shaft, is mounted on the shaft rod to provide a smooth manual hand grip surface to permit a user's hand to slidably grip the tool in a large variety of longitudinal positions along the lengthwise axis of the rod. The tool is specifically designed to permit a user in a standing position to manipulate the tool using an underhanded sliding grip with one hand on the smooth handle grip.

6 Claims, 1 Drawing Sheet

STAND UP HAND CULTIVATOR

BACKGROUND OF THE INVENTION

This invention relates to a new and improved stand-up hand-manipulated soil penetrating tool.

SUMMARY OF THE INVENTION

The preferred embodiment of the present invention as shown in the accompanying drawings and to be described in more detail, comprises an elongate spear shaft, at least one end of which is pointed or otherwise formed to provide a leading edge for expeditious soil penetration for purposes of cultivation, weeding, or the like. An elongate tubular handle grip, preferably extending about 2/5 the length of the shaft, is mounted on the shaft rod to provide a smooth manual hand grip surface to permit a user's hand to slidably grip the tool in a large variety of longitudinal positions along the lengthwise axis of the rod. The tool is specifically designed to permit a user in a standing position to manipulate the tool using one or two hands on the smooth handle grip.

OBJECTS AND ADVANTAGES OF THE INVENTION

It is well known that the most efficient way to water a plant is to channel water from ground surface deeply and directly to the plant roots. In hose watering, for example, most soils (excluding very sandy or loamy soils) do not absorb water at the rate that the water is applied to the surface around the plant. Accordingly, dependent upon the degree of absorbency of the soil and volume of water flow rate, a great deal of water flows horizontally on the earth's surface away from the plant and to areas of the garden spot where there are no plantings and the water is simply wasted.

More conventional hand cultivators of the spade, hoe, prong, or blade type require substantial physical effort, oftentimes in kneeling or bent over body positions. The present invention is designed to be comfortably manipulated by one hand by a user in a virtual standing position requiring minimal back, arm, or wrist strength.

An energy saving advantage and feature over known prior art cultivators is that the because the unit can be operated in a comfortable stand-up position with the user's arm and elbow dangling from the user's side and with the unit held in balanced position with an underhand grip, and because the preferred steel shaft weighs in the neighborhood of 2½ to 3½ pounds, there is provided a substantial amount of tool "heft" so as to permit the user to use the inherent weight of the tool to do the work—analogous to letting the weight of the hammer drive a nail.

Intelligent use of the invention can be employed to maximize conservation of water, in that cultivation of any plant or bush can be easily targeted to include deep penetration only around the root circumference of the plant without having to unnecessarily water non-root growing areas between individual plantings. Even in closely planted and in small plant areas, this ability to target or focus on cultivating individual plants rather than area cultivation apply in that the water savings over area watering can be dramatic to the extent of providing adequate irrigation with utilizing only ten to 15 percent of what would be required in overhead area irrigation.

Another featured advantage of the present invention is that because of its length and spear type soil penetrating movements, the pointed end can be projected into the rooted stems of various low growing and bushy or heavily leaved plants where no other type of known cultivator could be manipulated. In short, a single stemmed plant with leaves or branches extending outwardly and near ground level 12 to 24 inches simply cannot be reached with any kind of hoe, spade, or other blade type conventional hand cultivator. Indeed, it is not even necessary for a user of the present invention to actually see the pointed end of the device crevice the earth under ground level bushes or leaves as he can tell from the "feel" of the tool as to whether the pointed end has penetrated the soil prior to levering down on the handle area to cause the soil to necessarily upset and fissure.

Another object and advantage is that the tool embodying the present invention may be used to cultivate in and around extremely shallow rooted plants (such as azaleas, strawberries, ivy, etc.) without cutting or destroying the roots themselves. The pointed end of the spear type cultivator, instead of cutting through or severing the roots will, for all practical purposes, push the roots aside upon its progressive penetration into the soil. The use of a spade, blade or other type of conventional cultivator will almost invariably chop or cut the roots and permanently damage the root system of the plant.

Figure 3:
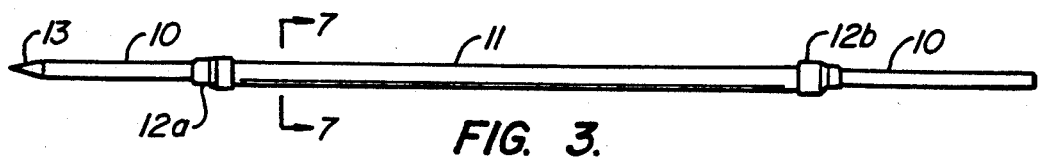
FIG. 3 is a side longitudinal elevational view of one simple embodiment of the invention.

Referring now more specifically to the drawings, FIG. 3 discloses a tool embodying the invention in its simplest form. The tool comprises an elongate substantially structurally rigid shaft or rod 10 which is surrounded for about 2/5 of its length by a tubular handle grip 11 fixed against longitudinal sliding relative to shaft 10 by conventional crimp-on ferrules or hose clamps 12a, 12b.

The tubular handle 11 may consist of a length of black, relatively slick, polyethylene hose such as used extensively in drip irrigation system water lines. The interior diameter of the tubular plastic need be only a fraction in excess of the exterior diameter of the shaft 10 so that in manufacturing assembly the tubular handle grip can be slid from one end of the shaft to a point approximately midway the ends and thereupon secured in position by the ferrules or hose clamps 12a and 12b, respectively.

The shaft 10 may vary in length between approximately four feet minimum to six feet maximum and for most adult users, male or female, of average height, a shaft length of approximately five feet works very satisfactorily. The shaft material theoretically be made of any fairly rigid material including steel bar, aluminum tubing, or even wood or plastic. For purposes of cultivation it is recommended that the shaft be made of ⅜" to ⅝" diameter round steel bar stock or steel rebar and preferably about ½". Hot-rolled steel bar of substantially less than ½" diameter tends to bend at and deform when too much upon downward leverage being applied by a user, whereas a steel shaft in the neighborhood of 5' long with a diameter substantially exceeding ½" becomes uncomfortably heavy to conveniently manipulate. A 5' long ½" diameter round steel bar weighs in the neighborhood about 3.5 pounds which gives the tool "heft" without being too heavy to hand hold and manipulate by most users. Based on a weight per lineal foot ratio, in a tool measuring four to six feet in overall length, the spear shaft may vary from 0.40 to 0.70 lbs per lineal foot to provide sufficient "heft" to the tool.

In FIG. 3, at least one end of the shaft 10 is ground or otherwise formed into a pencil-point shape to facilitate soil penetration. This simple structure permits the tool to be used as an effective cultivator as well as a standup garden weeder as will more specifically be described hereinafter.

Figure 4:
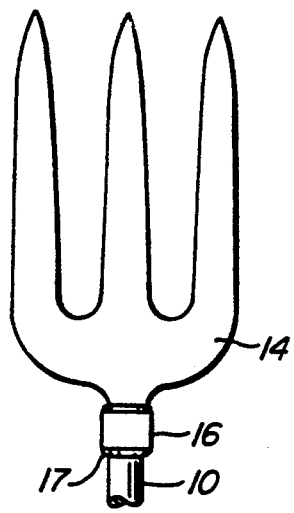
FIG. 4 is an enlarged view of an optional form of cultivator attachment for the tool.

FIG. 4 shows a three-pronged metal cultivator head 14 which may be rigidly affixed to one end of shaft 10 by any suitable means. FIG. 4 shows a tubular socket 16 into which the end of shaft 10 is inserted and thereafter welded as shown by the bead 17.

Figure 5:
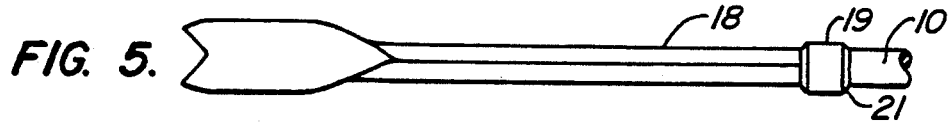
FIG. 5 is a top plan view of a weeder attachment.

FIG. 5 shows a top plan view of a weeder attachment 18 that may similarly be affixed to an end of the shaft 10 by a tubular socket and weld combination 19 and 21, respectively.

Figure 6:
FIG. 6 is a side elevational view of same.

FIG. 6 is a side elevational view of the weeder shown in FIG. 5 with parts numbered the same.

Figure 1:
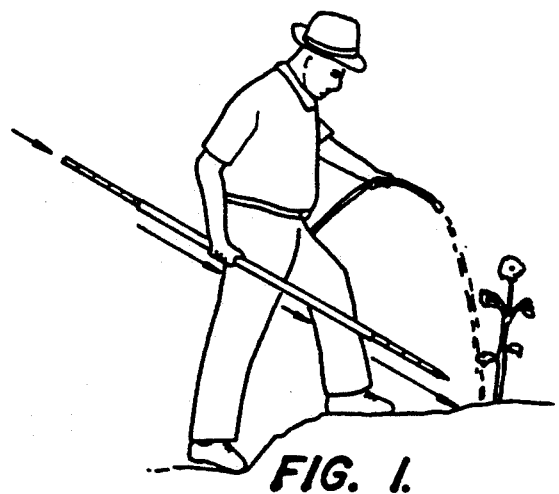
FIG. 1 demonstrates how a user may initially manipulate a tool embodying the present invention from a standing position prior to soil contact and penetration.
Figure 2:
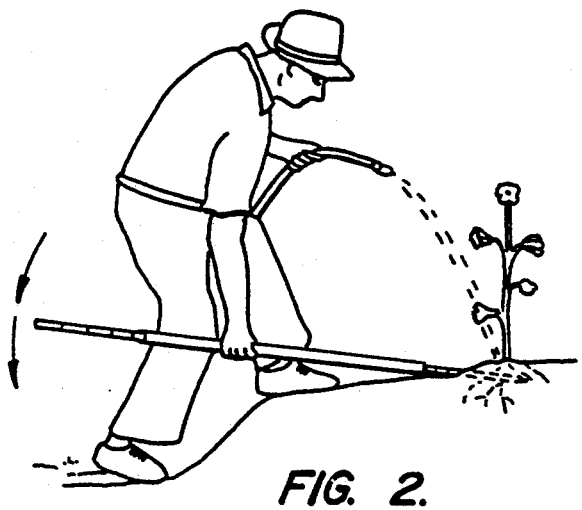
FIG. 2 is similar to FIG. 1 showing how the tool may be further manipulated to upset the soil after tool penetration.
Figure 7:
FIG. 7 is a sectional view through line 7—7 of FIG. 3.

One preferred use of the rod is depicted in FIGS. 1 and 2 of the drawings wherein it is demonstrated that a user, while standing substantially upright, can easily grip the tool 10 underhanded with only one hand adjacent to the balance center point of the rod and with a slight swinging arm movement cause the pointed end of the tool to penetrate the soil adjacent a plant root system to be cultivated. Upon additional penetration the user can slide his manual grip along the handle upwardly and, by pressing down, cause the rod to act as a type one lever with the pointed end extremities functioning as the short lever arm, the point of earth penetration as the fulcrum, and the remainder of the bar of the rod and attached handle functioning as the long lever arm. As the long lever arm is moved downwardly the penetrating pointed end of the rod causes the earth above it to "upset" to form relatively large and elongate fissures or crevices to which overhead hose water (or other overhead water) can channel downwardly directly it into the plant root system.

As also shown in FIGS. 1 and 2, it is both convenient and time saving for a user to manipulate the tool with one hand in the above-described manner while simultaneously hosing water with the other hand into the fissures or crevices as the soil is "upset" due to manipulation of the tool. In heavy weeding or cultivation, it is apparent that two handed manipulation of the tool from a stand up position may be desirable.

Although the present invention has been described in some detail by way of illustration and example, it is understood that various modifications may be made without departing from the spirit of the invention or the scope of the claims appended hereto.

As used herein and in the claims the term "stand up" refers to a tool that can be manipulated by a user from a standing position; the term "cultivator" includes a weeding tool unit or any other type of soil penetrating working end.

What is claimed is:

1. A stand-up hand-held spear-type soil cultivator, comprising:

an elongate spear body having an overall length of between about 4 to 6 feet;

said spear body made of a substantially rigid material;

a tubular hand grip portion circumferentially mounted on and surrounding a portion of the length of said spear body;

said hand grip having a grip area located at the midway balance point of the spear body and extending a substantial distance from said point in opposite directions toward opposite ends of said spear body;

said extended hand grip defining a smooth slick outside surface to permit a user with loosened hand pressure to slide his hand back and forth directionally toward and away from said midway point;

at least one end of said spear body defining a working end shaped and proportioned to facilitate its spearing penetration into soil.

2. The combination of claim 1 and wherein the spear body weighs at least an average of four tenths (0.40) pounds per lineal foot of spear length to provide same with substantial heft when said spear is thrust angularly downwardly into contact with the soil.

3. The combination of claim 1 and wherein the length of said hand grip extends from the midway balance point toward the second end opposite the first end of said spear body at least ⅓ the overall distance from the midway point to the second end of the spear body.

4. The combination of claim 1 and wherein at least the one working end of said spear body is formed as a tapered pencil point shape.

5. The combination of claim 1 and wherein the length of said hand grip is at least approximately 2/5 the overall length of said spear body.

6. The combination of claim 5 and wherein the outer surface of said hand grip defines a smooth slick slide surface to permit a user with loosened hand pressure to slide his hand back and forth directionally toward and away from said midway point.

* * * * *